United States Patent Office 3,022,119
Patented Feb. 20, 1962

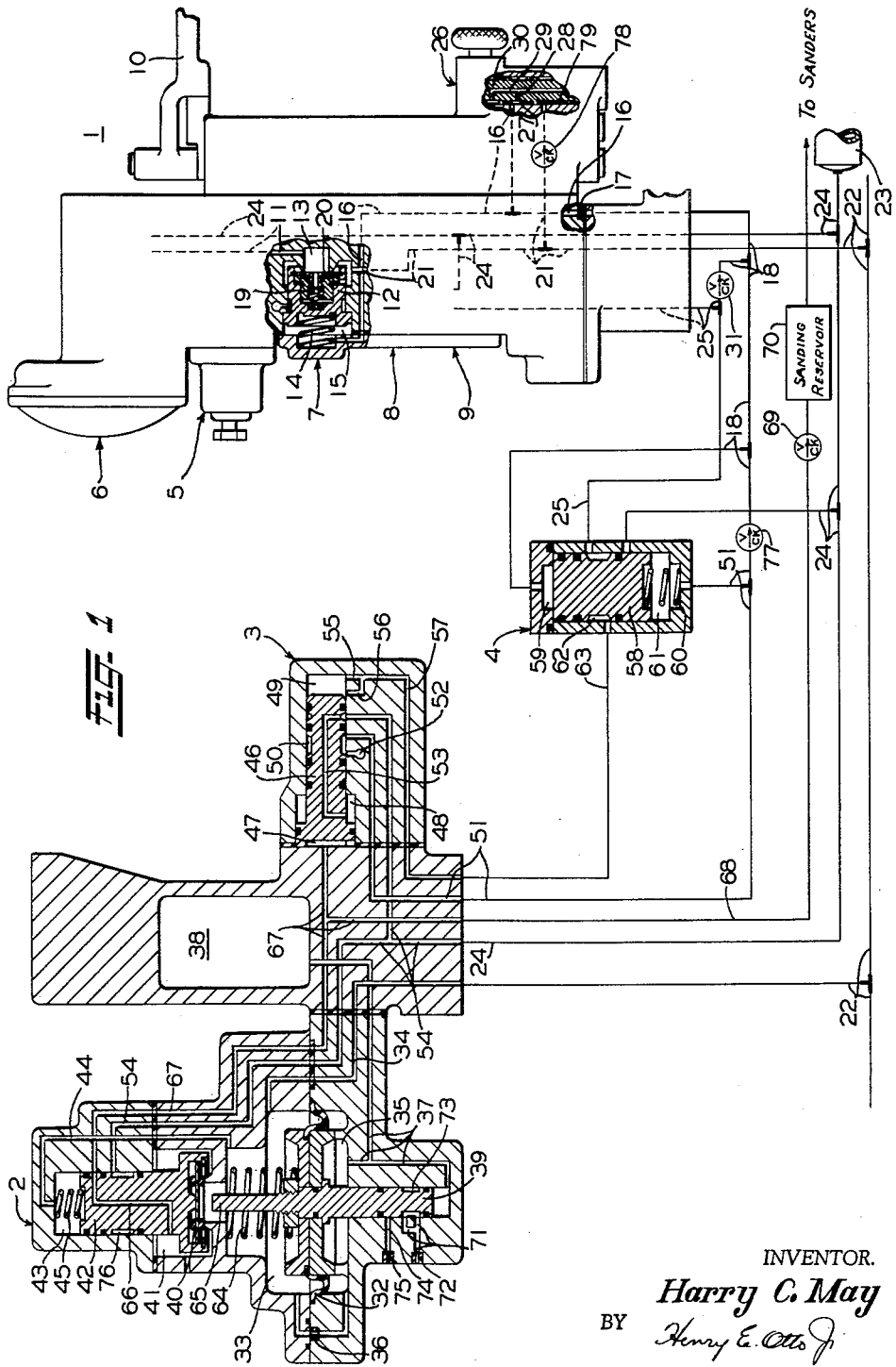

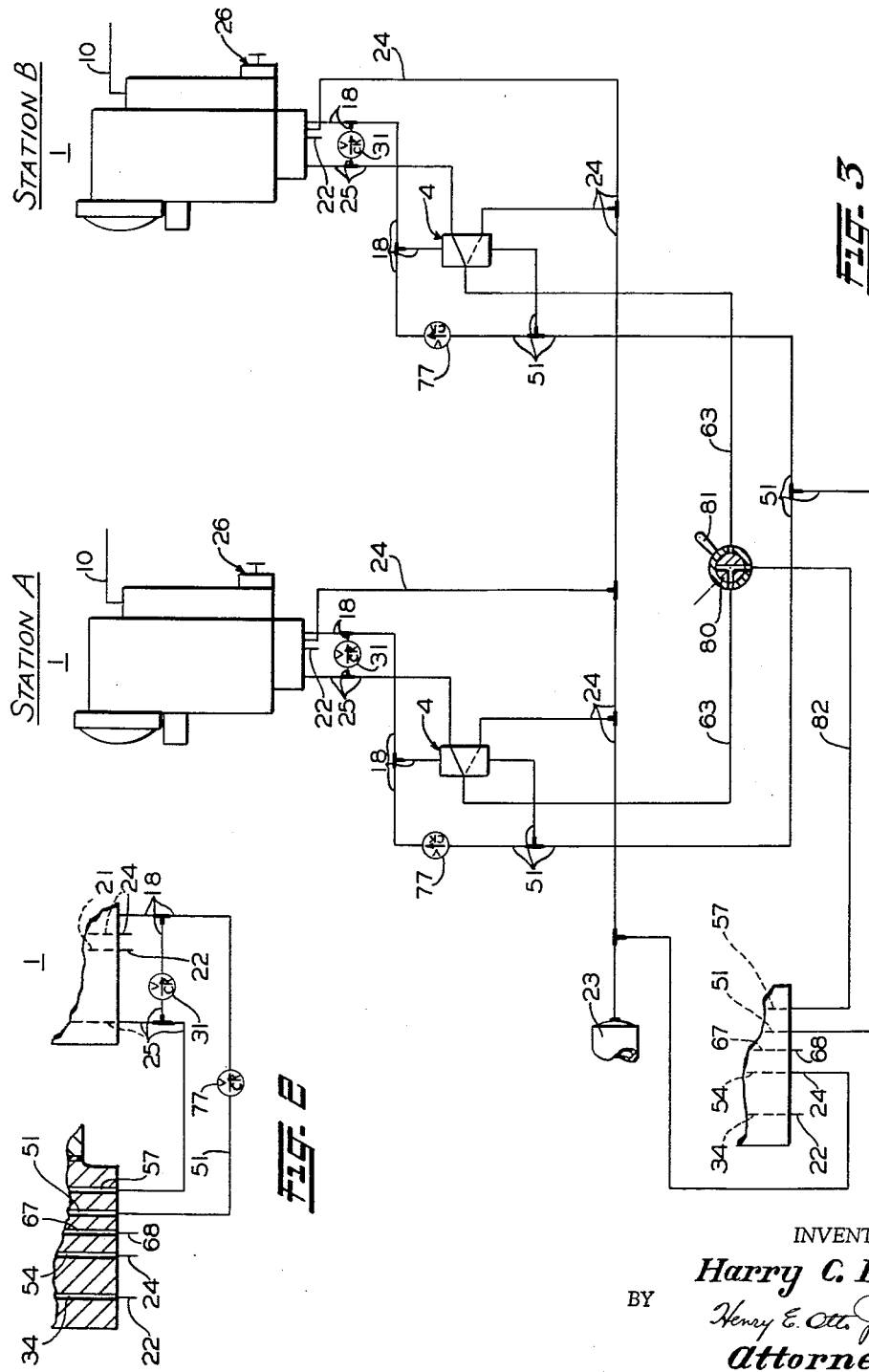

3,022,119
LOCOMOTIVE BRAKE EQUIPMENT WITH IMPROVED VENT VALVE AND BRAKE PIPE CUT-OFF VALVE INTERLOCK
Harry C. May, East McKeesport, Pa., assignor to Westinghouse Air Brake Company, Wilmerding, Pa., a corporation of Pennsylvania
Filed Dec. 15, 1958, Ser. No. 780,353
16 Claims. (Cl. 303—67)

This invention relates to locomotive brake equipments and more particularly to such equipments embodying means automatically operative to cut off flow of fluid under pressure to a brake pipe whenever an emergency rate of reduction in brake pipe pressure is effected either at the locomotive or anywhere else in a train.

In my copending application, U.S. Serial No. 764,296, filed September 30, 1958, now Patent #2,958,561, and assigned to the assignee of the present invention, there is fully shown and described a locomotive brake equipment embodying an engineer's automatic brake valve device. This brake valve device comprises a control valve device controlled by a brake valve handle for operatively, through the medium of a relay valve device, normally providing in the brake pipe fluid at a pressure corresponding to the position of said handle. Interposed between the relay valve device and the brake pipe is a brake pipe cut-off valve device operative to isolate the brake pipe from control by the control valve device upon charging of a normally vented chamber that is charged with fluid under pressure only upon operation of an emergency valve device responsively to movement of the brake valve handle to an emergency position or upon movement of a selector valve device to a cut-out position.

While this equipment operates satisfactorily under the limited conditions just described, it is desirable that means be provided for automatically effecting closure of the brake pipe cut-off valve device whenever an emergency reduction in brake pipe pressure is effected, whether such reduction be effected by movement of the brake valve handle to emergency position, by pull-apart of the train, by operation of a conductor's valve, or by other causes, so that the relay valve device will not attempt to maintain the brake pipe charged at a time when rapid venting of the brake pipe is desired.

The principal object of this invention is therefore to provide an improved locomotive brake equipment embodying means for supplying fluid under pressure to the normally vented chamber of the brake pipe cut-off valve device, and thereby effecting closure of the latter, whenever brake pipe pressure is reduced at an emergency rate.

Other objects and advantages will become apparent from the following more detailed description of the invention and from the accompanying drawings, wherein:

FIG. 1 is a diagrammatic view, partly in section and partly in outline, of a single station locomotive brake equipment suitable for multi-unit service, embodying one form of the invention;

FIG. 2 is a diagrammatic view of a portion of FIG. 1 showing a simplified form of the invention applied to a single station locomotive brake equipment suitable for single-unit service; and FIG. 3 is a diagrammatic view of a dual station locomotive brake equipment suitable for multi-unit service, embodying a modified form of the invention.

Description—FIG. 1

As shown in this figure, the locomotive brake equipment embodying the invention comprises an engineer's automatic brake valve device 1, a vent valve device 2, a brake pipe cut-off pilot valve device 3, and an interlock valve device 4.

The brake valve device 1 is preferably of the type fully shown and described in my aforementioned copending application. This brake valve device comprises a control valve device 5, a relay valve device 6, a brake pipe cut-off valve device 7, a brake pipe vent valve device 8, and an emergency valve device 9; the description of such valve devices being limited, for brevity and facility of understanding, to such matters as are pertinent to the present invention.

The control valve device 5 comprises valve means (not shown) controlled according to the arcuate position of a brake valve handle 10 to so pilot operation of the relay valve device 6 as to provide in a passage 11 fluid at a pressure corresponding to the position of said handle.

The brake pipe cut-off valve device 7 comprises a piston 12 that is subject opposingly to pressure of fluid in a chamber 13 open to passage 11 and to the combined pressures of a helical bias spring 14 and of fluid in a normally vented chamber 15 that is open via a passage 16 and a choke 17 to a brake pipe cut-off pipe 18. If pressure of fluid in chamber 13 is less than a chosen value, such as about 17 p.s.i., or if chamber 15 is charged with fluid under pressure, piston 12 will be biased to a cut-off position, in which it is shown, for causing a light spring 19 to seat an annular brake pipe cut-off valve 20 against an annular valve seat rib encircling chamber 13 and thereby prevent fluid flow between passage 11 and a passage 21 leading to a brake pipe 22 that extends through the locomotive and cars of a train.

The vent valve device 8 comprises valve means (not shown) actuated by movement of handle 10 to an emergency position to connect passage 21 to atmosphere for thereby venting the brake pipe 22; said valve means being ineffective in all other positions of said handle to vent said passage and the brake pipe.

The emergency valve device 9 comprises valve means (not shown) actuated by movement of handle 10 to emergency position to supply fluid under pressure from a main reservoir 23 via a pipe and passage 24 to a passage and pipe 25 for charging the latter; said valve means being operative in all other positions of said handle to connect passage 25 to atmosphere.

When a handle of a manually operable selector valve device 26 is in a freight position or a passenger position, as will be the case when the locomotive is a lead locomotive hauling a train, a branch of passage 16 will be opened to atmosphere via a cavity 27 and a restriction 28 and a vent passageway 29 in a selector slide valve 30; said restriction being of considerably smaller flow capacity than choke 17 so as to permit effective buildup in pressure in chamber 15 of device 7.

With the brake apparatus described in my aforementioned copending application, chamber 15 of brake pipe cut-off valve device 7 will be vented except when the brake valve handle 10 is moved to emergency position and actuates emergency valve device 9 to supply fluid under pressure to pipe 25 and thence directly by way of a check valve 31 to pipe 18 and hence chamber 15, for causing closure of the brake pipe cut-off valve 20 of device 7.

In the improved brake equipment herein proposed, however, the valve devices 2, 3 and 4 are provided for automatically supplying fluid under pressure to chamber 15 and thereby effecting closure of the brake pipe cut-off valve 20 whenever brake pipe pressure is reduced at an emergency rate, whether or not such reduction is effected by movement of the brake valve handle 10 to emergency position.

The vent valve device 2 comprises a movable abutment, such as a diaphragm piston 32, reciprocable in a sectionalized casing and having at one side a chamber 33 open via a passage 34 to a branch of brake pipe 22 and having at the opposite side a chamber 35. Chamber 35 is chargeable with fluid under pressure from chamber 33 via a charging choke 36 and is constantly open via a passage 37 to a quick action chamber 38. Coaxially connected to piston 32 is a quick action chamber dissipation valve 39, preferably of the cylindrical slide valve type, having sealing, slidably guided contact with the wall of an aligned bore open at one end to chamber 35 and open at the opposite end to chamber 35 by way of passage 37.

Arranged coaxially with and at the opposite side of piston 32 from valve 39 is a preferably disc-shaped vent valve 40 that is seatable against an annular valve seat rib encircling one end of chamber 33 and controls fluid pressure communication between chamber 33 and an atmospheric chamber 41. Arranged coaxially with vent valve 40 is another valve 42, which may be in the form of a cylindrical slide valve having sealing, slidably guided contact with the wall of an aligned bore open at one end to atmospheric chamber 41 and open at the opposite end to a chamber 43 which is constantly open to the brake pipe 22 via a passage 44 and the chamber 33. Valve 42 is biased by a helical spring 45 in chamber 43 to a normal position, in which it is shown, and in which said valve through abutting contact with the vent valve 40 operatively seats the latter; said vent valve being suitably retained, as by a retaining ring, in a recess in the adjacent end of valve 42.

The brake pipe cut-off pilot valve device 3 may, for sake of illustration, comprise a pilot valve 46 of the differential-area piston-valve type, sealingly reciprocable in a bore in a sectionalized casing. This valve 46 comprises a piston portion subject to one side to pressure of fluid in an application chamber 47 and at the opposite side to pressure of fluid in an annular chamber 48 surrounding a valve portion that is coaxially connected at its one end to the chamber 48 side of said piston portion and at the opposite end is subject to pressure of fluid in a chamber 49.

When with chamber 48 charged, chamber 47 is vented, pilot valve 46 will be biased to a normal position in which it is shown. With valve 46 in this position, an elongated annular cavity 50 in said valve will connect a passage and pipe 51 to a vent port 52; a passageway 53 in said valve always open to chamber 48 will connect the latter to a passage 54 leading to a branch of main reservoir pipe 24; and two ports 55, 56 leading from the pilot valve bore to a passage 57 will be uncovered past the unconnected end of said pilot valve to chamber 49.

The interlock valve device 4 may, for sake of illustration, comprise an interlock valve 58 of the spool type, sealingly reciprocable in a sectionalized casing. Valve 58 is subject at one end to fluid pressure in a chamber 59 open to a branch of pipe 18 and at the opposite end to the pressures of a helical bias spring 60 and of fluid in a chamber 61 open to a branch of pipe 51.

*Operation—FIG. 1*

Assume initially that the locomotive brake equipment is devoid of fluid under pressure; that pilot valve 46 is in its normal position; and that the selector valve 30 of device 26 is in freight (or passenger) position as shown, to condition the locomotive for service as a lead locomotive from which the engineer controls train movement.

Under this condition, the brake pipe cut-off valve 20 of device 7 will be held closed by the effect of springs 19 and 14. Interlock valve 58 will be biased by spring 60 to a normal position, in which it is shown, and in which an elongated annular cavity 62 in valve 58 connects a pipe 63 leading to passage 57 with pipe 25 which is then connected to atmosphere via check valve 31, pipe 18, and vent passageway 29 of valve 30. Movable abutment 32 of device 2 will be biased by a helical spring 64 in chamber 33 to a normal position, in which it is shown, and in which a pusher stem 65 coaxially connected to said movable abutment is retracted out of engagement with vent valve 40, with the result that spring 45 will operatively seat vent valve 40 and in so doing also bias valve 42 to its normal position, in which it is shown. With valve 42 in this position, a passageway 66 in said valve connects to atmospheric chamber 41 an application passage 67, one branch of which leads to application chamber 47 and another branch of which leads via an application pipe 68 and a check valve 69 to a sanding reservoir 70.

Hence, under the assumed conditions, all components will be in the respective positions in which they are shown in the drawing.

To initially charge the equipment, the main reservoir 23 is charged with fluid under pressure, and brake valve handle 10 is moved to a release position for causing the control valve device 5 to condition the relay valve device 6 to supply fluid from a branch of main reservoir passage 24 to passage 11 at a pressure corresponding to a preselected normal charge value of brake pipe pressure. When pressure in passage 11 exceeds the illustrative 17 p.s.i., piston 12 of device 7 will be shifted against the force of spring 14 and thereby carry brake pipe cut-off valve 20 away from its seat, for thereby connecting passage 11 to brake pipe passage 21 and thus causing the brake pipe 22 to be charged to its normal charge value.

Meanwhile, brake pipe pressure as noted in chamber 33 of device 2 will increase at a faster rate than chamber 35 and quick action chamber 38 can be charged via choke 36; and hence vent valve 40 will remain closed and passage 67 will be maintained vented via valve 42. Also, main reservoir pressure fluid will be supplied via pipe 24, passage 54 and passageway 53 of pilot valve 46 to chamber 48 for positively biasing said pilot valve to its normal position in which pipe 51 and hence chamber 61 of interlock valve device 4 is vented. Since chamber 59 of device 4 will then be vented via pipe 18, passage 16 and vent passageway 29 of selector valve 30, the interlock valve 58 will be maintained in normal position by spring 60 for maintaining pipe 63 and hence chamber 49 of device 3 connected to pipe 25, which with brake valve handle 10 in release position is then vented via the emergency valve device 9.

Hence, upon completion of initial charging, all components will be in the respective positions in which they are shown in the drawing, with the exception of the brake pipe cut-off valve 20, which will now be unseated.

Assume now that, with the brake valve handle 10 in any position except emergency position, brake pipe pressure is reduced at an emergency rate for any reason whatsoever, such as by a pull-apart or break-in-two of the train, or by actuation of the usual conductor's valve (not shown). Under this condition, brake pipe pressure in chamber 33 will be rapidly reduced and cause movable abutment 32 to initially shift against the force of spring 64 to a service position in which passage 37 is uncovered past the lower end of valve 39 to a vent passage 71, one branch of which is always open to atmosphere via a choke 72 and another branch of which is then connected via an elongated annular cavity 73 in said valve to another vent passage 74 always open to atmosphere via a choke 75, for permitting pressure fluid in chamber 35 and quick action chamber 38 to blow down to atmosphere at a rate corresponding to the combined flow capacities of said chokes 72, 75, as well as backflow into the brake pipe at the very restricted rate controlled by charging choke 36. However, the combined flow capacities of the chokes 72, 75, 36 are so selected that they will reduce quick action chamber pressure at about the same rate as brake pipe pressure when brake pipe pressure is being reduced at a service rate but not when brake pipe pressure is being reduced at an emergency rate; and hence upon an emergency rate of brake pipe pressure reduction, a fluid pressure differential will rapidly be developed across movable abutment 32 sufficient to cause the latter to shift further against the force of spring 64 to an emergency position, in which quick action chamber pressure will blow down to atmosphere solely via and at the rate controlled by chokes 72 and 36 (because cavity 73 will no longer connect passage 74 with passage 71), and in which the pusher stem 65 will hold vent valve 40 unseated and also will have shifted valve 42 to an emergency position, against the force of spring 45.

With vent valve 40 unseated, brake pipe pressure fluid will be locally completely vented to atmosphere at large capacity, for causing an emergency application of brakes in the well-known manner. With valve 42 in emergency position, application passage 67 will be disconnected from atmospheric passageway 66 and connected via an elongated annular cavity 76 in valve 42 to a branch of passage 54 for supplying main reservoir pressure fluid to passage 67.

Meanwhile, some of the main reservoir pressure fluid thus supplied to passage 67 will flow via pipe 68 and check valve 69 to sanding reservoir 70 for actuating the sanders to sand the rails to provide increased traction for the emergency stoppage of the train; and some of such fluid will also flow from passage 67 to application chamber 47 for causing the pilot valve 46 to be shifted rightward to an application position against opposition of main reservoir pressure in chamber 48 and atmospheric pressure in chamber 49, it being noted that chamber 49 is then connected to atmosphere via pipe 63, interlock valve cavity 62, pipe 25 and emergency valve device 9.

As pilot valve 46 moves to its application position, various O-ring seals encircling the valve portion are so spaced axially along valve 46 as to disconnect valve cavity 50 from vent port 52, and then uncover said cavity to passage 54 for supplying main reservoir pressure fluid from passage 54 via said cavity to passage 51, and then connect valve passageway 53 to port 56 for causing chamber 48 as well as chamber 49 to be concurrently connected to the then vented passage 57.

Pressure fluid thus supplied to passage and pipe 51 will flow via a check valve 77 to a branch of pipe 18 and thence via choke 17 and passage 16 to chamber 15 for promptly shifting piston 12 rightward to effect closure of the brake pipe cut-off valve 20. It is to be noted that under the condition just described, spring 60 will maintain the interlock valve 58 in its normal position, in which it is shown, because main reservoir pressure fluid will be supplied to chamber 61 from pipe 51 and to chamber 59 from a branch of pipe 18.

Meanwhile, after chamber 33 and hence the brake pipe 22 have been vented, quick action chamber pressure in chamber 35 will blow down, via communications above described, to within a chosen degree of brake pipe pressure, as determined by the bias effect of springs 64, 45; whereupon said springs will return movable abutment 32 to its normal position, in which it is shown, for permitting closure of the vent valve 40 and venting passage 67. Upon venting of passage 67, operation of the sanders will terminate when pressure fluid in sanding reservoir 70 is depleted, but pilot valve 46 will remain in its application position because chambers 48, 49 are now also vented.

Hence, the brake pipe cut-off pilot valve 46 operates desirably to maintain supply of main reservoir pressure fluid to pipe 51 and thereby to chamber 15 of device 7 so as to maintin the brake pipe cut-off valve 20 closed after the vent valve 40 is reseated, which will usually occur about 7 seconds after it was unseated. It will be apparent that if the device 3 were eliminated and pressure fluid supplied directly from passage 67 to pipe 51 and thence via check valve 77 to chamber 15 of device 7, the brake pipe cut-off valve 20 would reopen after passage 67 is revented by valve 42 because pressure fluid supplied to said chamber bleeds to atmosphere at the rate controlled by restriction 28 in selector valve 30. This bleed via restriction 28 is necessary to assure that no pressure will be trapped in chamber 15 that would prevent reopening of the cut-off valve 20; moreover, it would be dangerous to rely on a trapped pressure (which could be relieved by a vent cock for chamber 15 instead of the restriction 28) to hold the cut-off valve 20 closed, because if pressure leaked out of chamber 15 and the valve 20 reopened, the brake pipe 22 would be recharged and completely release the brakes. Thus, the arrangement herein disclosed, not only serves to automatically hold the emergency brake application in effect indefinitely, but minimizes the operations which an engineer must perform to release the emergency application of brakes.

To release the emergency application of brakes, the engineer must first move the brake valve handle 10 to emergency position, to effect return of the pilot valve 46 to its normal position, in the manner now to be explained, after which he may move the handle to release position for releasing the brake application.

Movement of handle 10 to emergency position will cause the emergency valve device 9 to operate to cut off pipe 25 from atmosphere and supply fluid under pressure from main reservoir passage 24 to pipe 25, whence it will flow via check valve 31 to pipe 18 and thence to chamber 15 for maintaining the brake pipe cut-off valve 20 closed. However, some of the main reservoir pressure fluid supplied to pipe 25 will flow via interlock valve cavity 62, pipe 63 and port 55 to chamber 49 and via port 56 and passageway 53 to chamber 48 for shifting pilot valve 46 leftward to its normal position, in which it is shown, after chamber 47 has been revented by return of valve 42 to its normal position concurrently with reseating of vent valve 40.

During this leftward movement of pilot valve 46, passage 54 will be reconnected to passageway 53 for maintaining chamber 48 charged with main reservoir pressure fluid, and passage 51 will be connected to vent port 52. Chamber 61 of device 4 will be vented in consequence of the venting of passage and pipe 51 and cause main reservoir pressure fluid in chamber 59 (then charged via pipe 25, check valve 31 and pipe 18) to shift the interlock valve 58 against the force of spring 60 to a supply position, in which valve cavity 62 connects main reservoir pipe 24 with pipe 63 for maintaining the supply of main reservoir pressure fluid to passage 57 and hence to chambers 49, 48 and thus positively biasing the pilot valve 46 to its normal position. This is merely an ancillary function of the interlock valve 58, however, its primary function will be explained presently.

After the pilot valve 46 has been returned to its normal position, the engineer may move brake valve handle 10 to release position; whereupon the emergency valve device 9 will vent the pipe 25, for terminating supply of main reservoir pressure fluid to chamber 15. When pressure of fluid in chamber 15 blows down sufficiently by way of restriction 28 of selector valve 30, the pressure fluid meanwhile being supplied by relay valve device 6 to chamber 13 will shift piston 12 and thus unseat the brake pipe cut-off valve 20 to permit effective recharging of the brake pipe 22. Meanwhile, as pressure in chamber 15 blows down, pressure in chamber 59 of device 4 will likewise blow down via pipe 18 and choke 17, and cause interlock valve 58 to be returned to its normal position by spring 60.

Hence, the various components will once again be in the respective positions they assumed at the completion of initial charging.

From the foregoing, it will be apparent that if an emergency application of brakes is initiated by movement of brake valve handle 10 to emergency position, the emergency valve device 9 will admit main reservoir pressure fluid to pipe 25, whence it will flow via check valve 31 to pipe 18 and hence chamber 15 for effecting closure of brake pipe cut-off valve 20, in the same manner as described in my aforementioned copending application; also some of such fluid will flow from pipe 25 through cavity 62 and port 55 to chamber 49 such that both chambers 48 and 49 will be concurrently charged and thus prevent unnecessary shifting of the pilot valve 46 to application position because the brake pipe will be locally vented by the vent valve device 8 when handle 10 is in emergency position.

It will also be apparent that when the brake valve handle 10 is moved to some position, such as a service position, for effecting a service application of brakes, the brake pipe cut-off valve 20 will remain open because fluid pressure in chamber 13 will not be reduced below the illustrative 17 p.s.i. (corresponding to the bias force of spring 14) and chamber 15 will be maintained vented via restriction 28 because pipes 25 and 51 will be concurrently vented and no pressure fluid will therefore be supplied to pipe 18 past check valves 31 and 77 respectively. No pressure fluid will be supplied to pipe 51 during a service application of brakes because movable abutment 32 will not move beyond its service position in which, as previously stated, quick action chamber pressure will blow down by way of chokes 72, 75 and 36 at substantially the same rate as brake pipe pressure is being reduced, and hence prevent pusher stem 65 from being shifted far enough to unseat vent valve 40 and shift valve 42 to its emergency position.

It should now be noted that no bias spring is provided to bias pilot valve 46 to normal position, because such a spring would prevent said valve from staying in application position upon reventing of the chamber 47 following a train-line (non-manually effected) emergency application of brakes. There is therefore a possibility that upon initiation of initial charging, the pilot valve 46 may happen to be in its application position. If this should be the case, main reservoir pressure fluid will be supplied via passage 54, passage and pipe 51, check valve 77 and pipe 18 to chamber 15 and thus hold the brake pipe cut-off valve 20 closed. However, since this will prevent charging of the brake pipe 22, the engineer will promptly realize the situation from his brake pipe pressure gage and should move the brake valve handle 10 to emergency position to supply main reservoir pressure fluid to pipe 25 and hence to chamber 49 for positively shifting the pilot valve 46 to its normal position. No lengthy delay will be experienced as a result of such emergency application, because the brake pipe 22 has not been charged. Thereafter, the handle 10 can be promptly returned to release position to effect charging of the equipment in the manner described in connection with initial charging.

In previous description of operation it has been assumed that the locomotive brake equipment is conditioned for use on a locomotive that is being used as a lead locomotive to haul a train. To condition the locomotive so that it may be used as a trailing locomotive in multiple unit service to provide auxiliary power, or so that it may be hauled dead in a train, and thus cause the brakes on such locomotive normally to be controlled from the lead locomotive, the selector valve 30 is manually moved to a cut-out position. With valve 30 in this position, cavity 27 will be disposed above and out of registry with passage 16 for cutting off the latter from restriction 28 and atmosphere; and fluid under pressure will be supplied from a branch of brake pipe passage 21 by way of a check valve 78 and a valve cavity 79 to passage 16 for charging chamber 15 so as to continually maintain the brake pipe cut-off valve 20 closed. Check valve 78 will prevent venting of chamber 15 upon venting of the brake pipe 22 during an emergency application of brakes, but will normally permit pressure in said chamber to be maintained against leakage.

Meanwhile, some of the pressure fluid thus supplied to passage 16 will flow via choke 17 and pipe 18 to chamber 59 of device 4 for shifting interlock valve 58 (against the atmospheric pressure then in chamber 61) to, and maintaining it in, its supply position, in which pressure fluid will be supplied via main reservoir pipe 24, valve cavity 62, pipe 63 and passage 57 to chamber 49 for holding pilot valve 46 in its normal position in which it is shown, and in which main reservoir pressure fluid will also be supplied via passageway 53 to chamber 48.

It will thus be apparent that when the locomotive is conditioned to serve as a trailing locomotive in multi-unit service, or is hauled dead, the interlock valve 58 will operate to supply main reservoir fluid to chamber 49 and thereby assure that the pilot valve 46 will be biased to normal position by main reservoir pressure in both chambers 48, 49 and not move out of said position when main reservoir pressure fluid is supplied to chamber 47 in response to an emergency rate of reduction in brake pipe pressure; however, brake pipe pressure will be locally vented by unseating of vent valve 40 for desirably propagating the brake pipe pressure reduction wave rearward through the train and the sanders will be actuated by supply of pressure fluid to the sanding reservoir 70.

*Description and operation—FIG. 2*

The locomotive brake equipment constructed according to this embodiment is identical with that more completely shown in FIG. 1 and already described, except that the interlock valve device 4 is eliminated, pipe 25 is connected directly to passage 57, and passage and pipe 51 is connected solely to the check valve 77. This simplified equipment may be used if the locomotive is to be used only in single unit service and thus will be the only locomotive for hauling the train and the only locomotive from which brakes will normally be controlled.

Referring to FIGS. 1 and 2, it will be seen that when brake valve handle 10 is moved to emergency position and causes supply of main reservoir pressure fluid to pipe 25, some of such pressure fluid will flow past check valve 31 to pipe 18 for causing prompt closure of the brake pipe cut-off valve 20, and some of such pressure fluid will also flow directly via passage 57 to chamber 49 of device 3 so that pilot valve 46 will be held in normal position by main reservoir pressure concurrently acting in chambers 49, 48 against main reservoir pressure which will be supplied to chamber 47 via valve 42 and passage 67.

If while the brake valve handle 10 is in any position except emergency position, and pipe 25 is therefore vented, an emergency reduction in brake pipe pressure should be initiated, such as by pull-apart of the train, the consequent charging of passage 67 will cause pilot valve 46 to be shifted to its application position, against main reservoir pressure in chamber 48 and atmospheric pressure in chamber 49, for continually supplying main reservoir fluid to pipe 51 and thence via check valve 77 to pipe 18 for effecting closure of the brake pipe cut-off valve 20 despite the restricted bleed of pressure fluid to atmosphere via restriction 28; it being noted that under the type of operation assumed, the selector valve 30 will be in a freight position (or a passenger position) in which passage 16 is connected to atmosphere via said restriction.

As with the equipment disclosed in FIG. 1, the brake valve handle 10 must be moved to emergency position in order to return the pilot valve 46 to its normal position and thus effect opening of the brake pipe cut-off valve 20; whereupon the brake pipe 22 may be recharged to effect a release of the brakes by moving said handle to release position.

It will be apparent that the equipment constructed according to this embodiment may be further simplified, if desired, by eliminating check valve 31 and the branches of pipes 25 and 18 so that pressure fluid will not be supplied to pipe 18 upon charging of pipe 25; and this, in turn, will permit elimination of check valve 77 and permit direct connection of pipe 51 with pipe 18. Since the pipe 51 and hence pipe 18 will be vented via port 52 with pilot valve 46 in normal position, and hence vent chamber 15 of device 7, it will not be necessary to employ the selector valve device 26. With device 26 eliminated, the equipment will be suitable only for locomotives always used to haul a passenger train or a freight train and not capable of being hauled dead or as a trailing locomotive in multiple unit service.

*Description and operation—FIG. 3*

The locomotive brake equipment constructed according to this embodiment of the invention comprises, basically, a pair of equipments of the type disclosed in FIG. 1, one for each station (designated "station A" and "station B") of a dual-station locomotive equipment suitable for multi-unit service, but employing only one valve device 2 and valve device 3 for both stations; and a valve 80, preferably in the form of a cock, to which the pipes 63 of the respective stations A and B are connected instead of being connected to passage 57, said valve 80 being operable by a handle 81 to selectively connect the pipe 63 of station A or the pipe 63 of station B with a pipe 82 leading to passage 57 of device 3.

In operation, assume that the locomotive brake equipment shown in FIG. 3 is initially charged and that the locomotive provided with such equipment is to be a lead locomotive.

Referring to FIGS. 1 and 3, if the engineer desires to control brakes from station A, he moves handle 81 of valve 80 to the position in which it is shown (if not already there), so as to connect pipe 63 of station A with pipe 82 and lap pipe 63 of station B; and he also manually actuates selector valve 30 of the device 26 of station B to its cut-out position, so as to effect supply of fluid under pressure to chamber 15 for closing the brake pipe cut-off valve 20 at station B, it being noted that fluid under pressure will also be supplied to pipe 18 and cause the interlock valve 58 of device 4 at station B to be shifted to its supply position, in which fluid under pressure is supplied from main reservoir pipe 24 to pipe 63 of station B but this will be without consequence because said pipe 63 will then be lapped.

It will thus be seen that with pipe 63 of station A connected to pipe 82, pipe 25 at station A will be vented in all positions of brake valve handle 10 at station A except emergency position. Since selector valve 30 of the device 26 at station A will then be in freight position (or passenger position) in which pipe 18 and the brake pipe cut-off valve chamber 15 will be open to atmosphere via the restriction 28 in said selector valve, it will be apparent that with pipe 25 vented, the brake pipe cut-off valve 20 at station A will be open and chamber 49 of device 3 will be vented via passage 57, pipe 82, valve device 80, pipe 63, device 4 and vented pipe 25 of station A.

Hence, if while the brake valve handle 10 of station A is in any position except emergency position, an emergency rate of reduction in brake pipe pressure should occur, the device 2 will operate in the manner previously described to locally vent the brake pipe 22 by way of vent valve 40 for causing an emergency application of brakes, and also supply pressure fluid via passage 67 to chamber 47 of device 3 for shifting the pilot valve 46 to its application position, in which chamber 48 will be vented and main reservoir pressure fluid will be supplied from main reservoir passage 54 to pipe 51 and flow via check valve 77 to pipe 18 for causing closure of the brake pipe cut-off valve 20 at station A.

Meanwhile, some pressure fluid will also flow via branches of pipes 18 and 51 to opposite ends of the interlock valve 58 of device 4, and hence said interlock valve will be maintained by spring 60 in its normal position, for maintaining chamber 49 vented by way of passage 57, pipe 82, valve 80, pipe 63, device 4 and the then vented pipe 25. Also, some of the pressure fluid supplied to pipe 51 will also flow to the lower end of device 4 of station B and cause the interlock valve 58 to be moved up to normal position by spring 61 and thus vent pipe 63 at station A by way of pipe 25; but this will be without consequence because said pipe 63 is then lapped by valve 80. Also, check valve 77 at station B will prevent flow of pressure fluid from pipe 51 to pipe 18 because the latter is already charged to the same pressure.

To release the emergency application of brakes, the engineer moves brake valve handle 10 at station A to emergency position for supplying pressure fluid via pipes 25 and 63, valve 80, pipe 82 and passage 57 to chamber 49 for shifting the pilot valve 46 to its normal position after venting of chamber 47 so as to vent pipe 51 and thus permit blowdown of pressure from pipe 18 at station A via restriction 23 of device 30; whereupon brake pipe cut-off valve 20 at station A will reopen and enable the engineer to move the brake valve handle 10 to release position and effectively charge the brake pipe 22 and thus release the brakes.

It will be understood from previous description that if the engineer moves brake valve handle 10 at station A to emergency position to initiate the emergency application of brakes, the brake pipe 22 will be vented via the vent valve device 8 (FIG. 1) as well as vent valve 40 but the pilot valve 46 will not be shifted because chambers 48 and 49 will then be concurrently charged.

If the engineer should desire to control brakes from station B, then handle 81 of valve 80 is moved counter-clockwise to lap pipe 63 of station A and connect pipe 63 of station B to pipe 82; and the selector valve 30 of device 26 at station A is moved to cut-out position and the selector valve 30 of device 26 at station B is moved from cut-out position to freight position (or passenger position). Brakes will now be controlled from station B in the same manner as already described in connection with such control from station A.

It will be recalled that, in previous description of operation of this dual-station locomotive brake equipment disclosed in FIG. 3, it was assumed that the locomotive provided with such equipment was to be used as a lead locomotive.

Referring to FIGS. 1 and 3 and assuming now that the locomotive provided with such equipment is to be used as a trailing locomotive in multi-unit service or hauled dead in a train, the selector valves 30 of the devices 26 at both stations A and B will be actuated to their respective cut-out positions for closing the brake pipe cut-off valves 20 at such stations and also causing some of the pressure fluid then supplied to the respective pipes 18 to actuate the respective interlock valves 58 of devices 4 at both stations to their supply positions.

Under this condition, pressure fluid will be supplied from main reservoir pipe 24 and the interlock valves 58 to the respective pipes 63 for supply to chamber 49 of device 3 by way of that pipe 63 then connected by the two-position valve 80 to pipe 82. Hence, with chambers 49 and 48 concurrently maintained charged, the pilot valve 46 will be biased to and always remain in its normal position, even if and when main reservoir pressure fluid is supplied to application chamber 47 during an emergency application of brakes.

It will now be apparent that if the dual-station locomotive brake equipment is to be employed on a locomotive which will always be used as a lead locomotive in multi-unit service or used as the only locomotive in single-unit service, the equipment as disclosed in FIG. 3 may be modified by eliminating the interlock valve devices 4 and the branches of pipes 51, 18, 25 and 24 connected thereto, and then connecting directly to the corresponding pipes 63 the branch of the respective pipes 25 which had theretofore led to the corresponding devices 4. With the equipment as thus modified, chamber 49 of device 3 will be vented via the then vented pipe 25 of the operative station and thus permit operation of the pilot valve 46 to application position during a train-line emergency (that is, an emergency application of brakes initiated other than by movement of brake valve handle 10 to emergency position). However, if the handle 10 at the operative station is moved to emergency position, pipe 25 at said station and hence pipe 82 will be charged and prevent operation of the pilot valve 46 to application position.

It will be apparent to those skilled in the art that the objects of the invention can be accomplished by use of structure and cooperative relationships which may differ somewhat from the arrangements shown, by way of illustration only, in various embodiments of the invention; and that certain desirable features shown as included in these embodiments may be eliminated, if they are not wanted or they are not required because of the type of service in which the locomotive is to be employed. Accordingly, it is therefore to be understood that the scope of the invention is not to be limited otherwise than by the terms of the appended claims.

Having now described my invention, what I claim as new and desire to secure by Letters Patent is:

1. In a locomotive brake equipment of the type comprising a normally charged brake pipe from which pressure fluid is vented at an emergency rate for causing an emergency application of brakes, and a control valve means operable by movement of a handle to various positions to normally cause pressure of fluid in the brake pipe to be varied according to the positioning of the handle, the combination of brake pipe cut-off valve means responsive to charging of a normally vented chamber to isolate the brake pipe from control by the control valve means so that the latter will be ineffective to control brake pipe pressure, means defining a communication via which fluid under pressure may be supplied to said chamber, pilot valve means subject to pressure of fluid in a normally vented application chamber acting in opposition to pressure of fluid in another normally charged chamber and normally biased by pressure in said other chamber to a normal position in which said communication is connected to atmosphere, and other valve means controlled by brake pipe pressure and a bias pressure opposing pressure of fluid in a quick action chamber having restricted connection with the brake pipe and operative to supply pressure fluid to said application chamber responsively to and during an emergency rate of reduction in brake pipe pressure for actuating said pilot valve means to an application position in which it vents said other chamber and supplies pressure fluid to said communication for causing such isolation of the brake pipe, said other valve means being operative to vent said application chamber when quick action chamber pressure is substantially equal to brake pipe pressure, whereby with said other chamber vented, said pilot valve means will remain in application position after reventing of said application chamber by said other valve means following termination of the emergency rate of reduction in brake pipe pressure and blow-down of quick action chamber pressure to substantial equality with the vented brake pipe so as thereby to cause the brake pipe to be maintained isolated from control by the control valve means and thus prevent the release of the emergency application of brakes if the handle should be positioned to call for a release of brakes.

2. In a locomotive brake equipment of the type comprising a brake pipe, and a control valve means operable by movement of a handle to various positions to normally cause fluid to be provided in the brake pipe at a pressure corresponding to the position of the handle, the combination of brake pipe cut-off valve means responsive to charging of a normally vented chamber to isolate the brake pipe from control by the contol valve means so that the latter will be ineffective to control brake pipe pressure, means defining a communication via which fluid under pressure may be supplied to said chamber, pilot valve means subject to fluid pressure in a normally vented application chamber acting in opposition to the pressure of fluid in another chamber normally charged with fluid under pressure and of lesser effective area than said application chamber such that said pilot valve means will normally be maintained in a normal position in which said communication is connected to atmosphere, means including a restriction via which a quick action chamber is chargeable with fluid under pressure from the brake pipe at a restricted rate, and a valve device controlled by brake pipe pressure and a bias pressure acting in opposition to quick action chamber pressure and comprising one valve means responsive to a service rate of reduction in brake pipe pressure to release quick action chamber pressure at substantially the same rate, and responsive to an emergency rate of reduction in brake pipe pressure to release quick action chamber pressure at a slower rate, said valve device including other valve means actuated by said one valve means upon an emergency rate of reduction in brake pipe pressure to locally vent the brake pipe to cause an emergency application of brakes and supply pressure fluid to said application chamber only until quick action chamber pressure is reduced to a chosen low value corresponding to said bias pressure, said pilot valve means being operative to an application position responsively to pressurization of said application chamber for venting said other chamber and supplying pressure fluid to said communication for effecting such isolation of the brake pipe, whereby with said other chamber vented said pilot valve means will remain in its application position for causing such isolation to continue after said application chamber is revented in consequence of quick action chamber pressure being reduced below said low value, so as thereby to cause the emergency application of brakes to be maintained in effect even if the handle is in a position which would call for a release of brakes or a service application of brakes.

3. The combination according to claim 2, wherein said pilot valve means is also subject to pressure of fluid in an additional chamber which is normally vented, and including a valve responsive to movement of the handle to one of its various positions to supply pressure fluid to another communication leading to said additional chamber for effecting return of said pilot means to its normal position following such reventing of said application chamber, whereby some affirmative act must be performed by the operator to demonstrate his alertness before the emergency application of brakes can be released.

4. The combination according to claim 3, further characterized in that the lomotive brake equipment is of the type wherein movement of the handle to said one position will mechanically actuate means for effecting local venting of the brake pipe and thus causing an emergency rate of reduction in brake pipe pressure, and including one check valve for permitting fluid flow from a branch of said other communication to a branch of the first-mentioned communication and preventing fluid flow in the reverse direction, and another check valve interposed in said first-mentioned communication between said pilot valve means and the last-mentioned branch for permitting fluid flow from said pilot valve means to the chamber of said brake pipe cut-off valve means and preventing flow in the reverse direction, whereby upon movement of the handle to said one position both said other chamber and said additional chamber will be concurrently charged and thus prevent operation of said pilot valve means to its application position upon charging of said application chamber, such that isolation of the brake pipe will be effected by pressure fluid supplied via said one check valve to said first-mentioned communication, said other check valve serving to prevent undesired venting of pressure fluid via said pilot valve means in normal position upon charging of the chamber of said brake pipe cut-off valve means by way of said one check valve.

5. In a locomotive brake equipment of the type comprising a brake pipe and a control valve means operable by movement of a handle to various positions to normally cause fluid to be provided in the brake pipe at a pressure corresponding to the position of the handle, the combination of brake pipe cut-off valve means responsive to charging of one chamber to isolate the brake pipe from control by the control valve means so that the latter will be ineffective to control brake pipe pressure, pilot valve means controlled by fluid pressure in an application chamber acting in opposition to the combined pressures of fluid in another chamber and in an additional chamber, said application chamber normally being vented and said other chamber normally charged for biasing said pilot valve means to a normal position in which a passage is connected to atmosphere, valve means operative to charge said application chamber with pressure fluid responsively to an emergency rate of reduction in brake pipe pressure such that if said additional chamber is then vented said pilot valve means will be actuated to an application position in which said other chamber is vented and pressure fluid is supplied to said passage, a check valve permitting fluid flow from said passage to said one chamber and preventing fluid flow in the reverse direction, selector valve means normally in a position for permitting release of pressure fluid from said one chamber at a restricted rate and operable to a cut-out position in which pressure fluid is supplied to said one chamber, and interlock valve means normally biased to one position and operative to a supply position for supplying pressure fluid to said additional chamber whenever said selector valve means is in its cut-out position, whereby upon charging of said application chamber, said pilot valve means will not be actuated to its application position for supplying pressure fluid via said passage and check valve to said one chamber if said selector valve means is in its cut-out position in which it supplies fluid pressure to said one chamber.

6. The combination according to claim 5, wherein said interlock valve means is subject opposingly to pressure of fluid in a chamber always open to said one chamber and to the combined pressures of a spring bias and of fluid in said passage, such that said interlock valve means will move to its supply position only if said one chamber is charged while said passage is vented via said pilot valve means in normal position.

7. The combination according to claim 5, including valves responsive to movement of the handle to an emergency position to locally vent the brake pipe and supply pressure fluid to another passage which is opened to said additional chamber by said interlock valve means when in its said one position, whereby said pilot valve means will be prevented from moving to application position during an emergency application of brakes initiated by such movement of the handle.

8. The combination according to claim 7, including a check valve for permitting fluid flow from said other passage to said one chamber and preventing fluid flow in the reverse direction, so as to effect such isolation of the brake pipe upon an emergency application initiated by movement of the handle to emergency position.

9. In a dual station locomotive brake equipment of the type wherein pressure of fluid in a brake pipe may be controlled selectively from one or the other of two stations according to which of these stations is conditioned to be the operative station, the combination of a control valve means and a brake pipe cut-off valve means and a selector valve means for each station, and a single pilot valve means for both of said stations, each of said control valve means when its station is the operative station being operative selectively by movement of a respective handle to various positions to normally cause fluid to be provided in the brake pipe at a pressure corresponding to the position of the handle, each brake pipe cut-off valve means being responsive to charging of a respective one chamber to isolate the brake pipe from control by the control valve means at the corresponding station, each selector valve means being operable to one position for permitting blowdown of pressure fluid from the corresponding one chamber to atmosphere at a restricted rate and operable to a cut-out position for preventing such blowdown and supplying pressure fluid to said corresponding one chamber for effecting such isolation of the brake pipe at the corresponding station, the selector valve means for the operative station being disposed in its one position and the selector valve means for the inoperative station being disposed in its cut-out position, said pilot valve means being subject to fluid pressure in a normally vented application chamber acting in opposition to the combined fluid pressures in another chamber normally charged with fluid pressure and in an additional chamber that is normally vented so as normally to cause said pilot valve means to be biased to a normal position for venting the high-pressure end of a branched one-way flow communication via which pressure fluid may flow only to the said one chambers of the respective stations, and a two-position valve operable selectively to cut off said additional chamber from the inoperative station and connect said additional chamber to the operative station so that said additional chamber will normally be vented via a vent at the operative station, said application chamber being charged with pressure fluid during an emergency rate of reduction in brake pipe pressure for causing said pilot valve means to be actuated to an application position provided said additional chamber is then vented, said pilot valve means in application position being operative to vent said other chamber and supply pressure fluid to said high-pressure end of said one-way flow communication for supply to the said one chamber of the operative station, whereby the brake pipe cut-off valve means of the inoperative station will be continually maintained in its brake pipe-isolating position by pressure fluid supplied to its said one chamber via the corresponding selector valve means in its cut-out position, and the brake pipe cut-off valve means of the operative station will be actuated to its brake pipe-isolating position by pressure fluid supplied to its said one chamber via said one-way flow communication responsively to operation of said pilot valve means to its application position.

10. The combination according to claim 9, including an emergency valve responsive to movement of the handle at the operative station to an emergency position to supply pressure fluid via another one-way flow communication to the said one chamber at said operative station in by-pass of the first-mentioned one-way flow communication for said operative station for promptly effecting operation of the corresponding brake pipe cut-off valve means to its brake pipe-isolating position.

11. The combination according to claim 9, including an interlock valve means for each station each biased to one position in which it is capable of venting said additional chamber and operative to a supply position responsively to operation of the associated selector valve means to its cut-out position, each interlock valve means in supply position being capable of supplying pressure fluid to said additional chamber, the interlock valve means for the operative station thus being disposed in its said one position for connecting said additional chamber by way of said two-position valve to the said vent, and the interlock valve means for the inoperative station being disposed in its supply position for supplying main reservoir pressure fluid to a pipe which is then cut off from said additional chamber by said two-position valve, whereby if the locomotive equipment is employed on a locomotive being used as a trailing unit in multi-unit service and the selector valve means for both stations are thus concurrently disposed in their cut-out positions, both brake pipe cut-off valve means will be maintained in their brake pipe-isolating position and pressure fluid will be supplied via one or the other of said interlock valve means to said additional chamber according to which of these interlock valve means is then connected via the two-position valve to said additional chamber, such that with said additional chamber and also said other chamber concurrently maintained charged said pilot valve means will be maintained in normal position throughout use of the locomotive as a trailing unit in multi-unit service.

12. The combination according to claim 11, wherein the interlock valve means for each station is controlled by pressure of fluid in a branch pipe always open to the corresponding one chamber acting in opposition to a bias force and pressure at the pressure of fluid in the said high-pressure end of the said corresponding one-way flow communication, whereby upon supply of pressure fluid to the corresponding one chamber the interlock valve means at the operative station will be actuated against said bias force from its one position to its supply position responsively to movement of the handle at the operative station to emergency position, for thereby preventing operation of said pilot valve means to its application position.

13. In a locomotive fluid pressure brake equipment, the combination of a normally charged brake pipe, a communication normally connected to the brake pipe, valve means controlled by an operator for controlling pressure of fluid in the communication and thereby normally correspondingly controlling brake pipe pressure, brake pipe cut-off valve means responsive to charging of one chamber to cut off the brake pipe from the communication, means including a restriction permitting pressure fluid in said one chamber to blow down at a restricted rate, pilot valve means controlling supply of pressure fluid from a source to said one chamber, a differential fluid pressure motor comprising means operably connected to said pilot valve means and providing a relatively large area subject to pressure of fluid in a normally vented application chamber and a smaller area subject to pressure of fluid in a normally charged chamber to cause said pilot valve means to be normally biased to one position in which it is ineffective to supply pressure fluid to said one chamber, and other valve means controlled by brake pipe pressure and a bias pressure acting in opposition to pressure of fluid in a different chamber having restricted connection with the brake pipe and operatively responsive to an emergency rate of reduction in brake pipe pressure to supply pressure fluid to said application chamber for causing said motor to actuate said pilot valve means to another position in which it supplies pressure fluid to said one chamber and vents said normally charged chamber, said other valve means being biased by said bias pressure to a normal position when pressure in said different chamber is within a chosen degree of brake pipe pressure, whereby with said normally charged chamber vented said pilot valve means will remain in said other position after return of said other valve means to normal position following termination of the emergency rate of reduction in brake pipe pressure thereby to cause the cut-off valve means to maintain the brake pipe cut off from the communication.

14. In a locomotive brake equipment including a brake pipe cut-off valve responsive to charging of a certain chamber to isolate a brake pipe from a communication normally connected to the brake pipe and in which pressure of fluid is operatively controlled according to manually selectable positioning of a control valve means, the combination of pilot valve means subject to pressure of fluid in a normally vented application chamber acting in opposition to pressure of fluid in a normally charged chamber and biased by the latter pressure to a normal position in which it is ineffective to supply pressure fluid to the certain chamber, said pilot valve means having an application position in which it connects said normally charged chamber to a vent communication and supplies pressure fluid to the certain chamber for causing such isolation, and other valve means subject opposingly to brake pipe pressure and a bias pressure acting in opposition to pressure of fluid in a volume open to the brake pipe via a restriction and responsive to an emergency rate of reduction in brake pipe pressure exceeding the flow capacity of said restriction to supply pressure fluid to said application chamber for actuating said pilot valve means to application position, said other valve means being biased to application position in which it vents said application chamber when pressure in said volume substantially equalizes with brake pipe pressure via said restriction, whereby upon such venting of the application chamber said pilot valve means will remain in application position.

15. A locomotive brake equipment according to claim 14, including operator-controlled means for supplying pressure fluid to another chamber, and means responsive to supply of pressure fluid to said other chamber to effect return of said pilot valve means to normal position, whereby an affirmative act of the operator is required to restore the pilot valve means to normal position and thus terminate such isolation so that the brake pipe may be effectively recharged.

16. In a locomotive brake equipment including a brake pipe cut-off valve responsive to charging of a certain chamber to isolate a brake pipe from control by a manually operable control valve means normally effective to control brake pipe pressure, the combination of pilot valve means controlled by pressure of fluid in one chamber opposing the combined pressures of fluid in second and third chambers, said one chamber normally being vented and said second chamber charged for biasing said pilot valve means to a normal position in which it vents a passage, valve means subject opposingly to brake pipe pressure and to pressure of fluid in a volume having restricted connection with the brake pipe and responsive to an emergency rate of reduction in brake pipe pressure to supply pressure fluid to said one chamber so that if said third chamber is then vented said pilot valve means will be actuated to another position in which said second chamber is vented and pressure fluid is supplied to said passage, a check valve permitting flow of pressure fluid from said passage to the certain chamber and preventing flow in the reverse direction, selector valve means normally positioned to permit release of pressure fluid from the certain chamber at a restricted rate and operable to a cut-out position in which pressure fluid is supplied to the certain chamber, and means for supplying pressure fluid to said third chamber whenever said selector valve means is in cut-out position, whereby upon charging of said one chamber said pilot valve means will be actuated to its other position for supplying pressure fluid via said passage and check valve to the certain chamber unless third chamber is charged by said selector valve means in cut-out position.

References Cited in the file of this patent
UNITED STATES PATENTS

| | | |
|---|---|---|
| 1,473,758 | Farmer | Nov. 13, 1923 |
| 1,653,136 | Thomas | Dec. 20, 1927 |
| 1,707,288 | Thomas | Apr. 2, 1929 |
| 2,367,575 | Good | Jan. 16, 1945 |